(12) United States Patent
Kudo et al.

(10) Patent No.: US 7,122,808 B2
(45) Date of Patent: Oct. 17, 2006

(54) RADIATION IMAGE CONVERSION PANEL

(75) Inventors: Shinji Kudo, Hino (JP); Takehiko Shoji, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 144 days.

(21) Appl. No.: 10/984,310

(22) Filed: Nov. 8, 2004

(65) Prior Publication Data

US 2005/0121621 A1    Jun. 9, 2005

(30) Foreign Application Priority Data

Nov. 14, 2003   (JP)   .............................. 2003-385265

(51) Int. Cl.
*G03B 42/08*   (2006.01)

(52) U.S. Cl. .................... 250/484.4; 428/690

(58) Field of Classification Search ............. 250/484.4; 428/690
See application file for complete search history.

(56) References Cited

U.S. PATENT DOCUMENTS

| | | | | |
|---|---|---|---|---|
| 5,496,790 | A * | 3/1996 | Ohno et al. ................. | 503/227 |
| 2002/0066868 | A1 * | 6/2002 | Shoji et al. ................ | 250/484.4 |
| 2003/0183777 | A1 * | 10/2003 | Struye et al. ............. | 250/484.4 |
| 2004/0026632 | A1 * | 2/2004 | Struye et al. ............. | 250/484.4 |
| 2004/0227462 | A1 * | 11/2004 | Utsumi et al. .............. | 313/506 |
| 2005/0067585 | A1 * | 3/2005 | Kudo et al. ............... | 250/484.4 |
| 2005/0112850 | A1 * | 5/2005 | Yamazaki et al. .......... | 438/487 |
| 2005/0274916 | A1 * | 12/2005 | Shoji et al. ................ | 250/580 |

FOREIGN PATENT DOCUMENTS

| | | |
|---|---|---|
| JP | 10-082899 A | 3/1998 |
| JP | 2002-122698 A | 4/2002 |
| JP | 2003-028995 A | 1/2003 |

* cited by examiner

*Primary Examiner*—Albert Gagliardi
(74) *Attorney, Agent, or Firm*—Frishauf, Holtz, Goodman & Chick, P.C.

(57) ABSTRACT

The present invention makes it possible to provide a radiation image conversion panel which can produce radiographic images having an excellent sharpness and having neither image unevenness nor line noise, while having a high scratch resistance property. The radiation image conversion panel is composed of a phosphor sheet having a stimulable phosphor layer coated on a support and a protective film designed to cover the stimulable phosphor layer and its panel having a highly improved scratch resistance property can be obtained by producing mean slope on the surface of a protective film Δa which is 0.014 or more and not more than 0.1. Sharpness of this panel can also be enhanced since a stimulating light which is scattered and reflected at the interface of a protective layer can be absorbed by preparing a stimulating light absorbing layer in the protective layer.

6 Claims, 2 Drawing Sheets

RADIATION IMAGE CONVERSION PANEL

TECHNICAL FIELD

The present invention relates to a radiation image conversion panel having a stimulable phosphor.

BACKGROUND

Although so-called radiography employing silver halide photography is conventionally used to obtain radiographic images, there also has been developed a radiographic imaging method not using silver halide photographic materials. It is the method with which radiographic images can be recorded by employing a radiation image conversion panel having a stimulable phosphor layer on a support.

In order to record a radiographic image by using a radiation image conversion panel, radiation that has been transmitted through an object is absorbed by a stimulable phosphor layer and a radiation energy depending on a radiation transmittance density on each part of the object is accumulated. A radiation energy accumulated in a stimulable phosphor can be emitted as a stimulated luminescence by irradiating the stimulable phosphor layer with electromagnetic waves (stimulating light) such as visible light and infrared radiation to excite on a time series basis. This signal based on light intensity can be reproduced as a visible image on a recording material such as a silver halide photographic sensitized material and a display apparatus such as CRT by converting this signal into an electric signal by, for example, photoelectric conversion.

It is described in JP-A No. 2003-028995 (hereinafter, the term, JP-A refers to Japanese Patent Application Publication) that a high-sensitivity radiation image conversion panel can be manufactured by using a stimulable phosphor expressed by the following formula (1), especially the stimulable phosphor exhibiting a numerical value in the range of $0.003 \leq e \leq 0.005$.

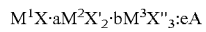

$$M^1X \cdot aM^2X'_2 \cdot bM^3X''_3 : eA \quad (1)$$

where $M^1$ represents at least one alkali metal selected from the group consisting of Li, Na, K, Rb and Cs; $M^2$ represents at least one divalent metal selected from the group consisting of Be, Mg, Ca, Sr, Ba, Zn, Cd, Cu and Ni; $M^3$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" represents at least one halogen selected from the group consisting of F, Cl, Br and I; A represents at least one metal selected from the group consisting of Eu, Tb, In, Ga, Cs, Ce, Tm, Dy, Pr, Ho, Nd, Yb, Er, Gd, Lu, Sm, Y, Tl, Na, Ag, Cu and Mg; and a, b and e respectively show numerical values within ranges of $0 \leq a < 0.5$, $0 \leq b < 0.5$ and $0.0001 < e \leq 1.0$.

Especially, divalent Eu activator-alkali metal fluoride type phosphor containing I, divalent Eu activator-alkali metal halide type phosphor containing I, rare earth element activator-rare earth oxyhalide type phosphor containing I, and Bi activator-alkali metal halide type phosphor containing I among stimulable phosphors mentioned above lead to a stimulated luminescence in enhanced luminance.

A radiation image conversion panel in which those stimulable phosphors are used has an advantage of accumulation of radiographic images once again after scanning and a repetitive use because an accumulated energy is released by scanning of a stimulating light after the radiographic image information is accumulated. Thus, this radiation image conversion method is of advantage from the aspect of resource conservation and economic efficiency because the radiation image conversion panel is repeatedly used, while radiographic sensitized materials are consumed for each radiographing in the case of a conventional radiographic imaging method.

Those radiation image conversion panels are used in quantities for a medical X-ray image diagnosis apparatus and so forth. In many cases, a stimulable phosphor is laminated on a support in a radiation image conversion panel and the radiation image conversion panel is often stored in a cassette for radiography to be handled.

A cassette for radiography (which is thereinafter called "cassette") is a flat enclosure which capable of storing a radiation image conversion panel which prevents not only a physical damage of a stimulable phosphor at the time of transportation or radiographing, but also an annihilation of accumulated image information caused by emitting a stimulating light to a stimulable phosphor after radiographing. As shown in FIG. 3, radiation image conversion panel 30 is stored in cassette 40 with stimulable phosphor 31 arranged to face front plane 41 of cassette 40.

Radiographing is carried out by arranging object 50 to face the outside surface of front plane 41 of cassette 40 in which radiation image conversion panel 30 is stored and by irradiating radiation transmitted through object 50 to radiation image conversion panel 30 in cassette 40. Compared with a method using silver halide, this radiography method makes it possible to obtain radiation images having sufficient amount of information, by an extremely small amount of radiation exposure.

A radiation image conversion panel in this method is used by repeating those steps of irradiation of radiation (recording a radiation image), irradiation of stimulating light (reading a radiation image recorded), and irradiation of erasure light (erasing a remaining radiation image). A conveying means such as a belt, a roller, and so forth is employed to transfer to each step.

Though a radiation image recording-reproducing method has many excellent advantages as described above, it is desired that the radiation image conversion panel used in the foregoing method is as highly sensitive as possible and it gives images having excellent image quality (sharpness, graininess, and so forth).

It has usually been thought that sharpness of an image obtained by a radiation image conversion panel becomes more enhanced with a thinner protective layer. But, a repetitive use tends to cause a degradation of durability with appearance of scratches and cracks generated on the surface of a protective layer when a protective layer is thin.

Especially in the case of a cassette type radiation image conversion panel, foreign matters sometimes adhere to a protective layer situated on the phosphor surface, when it is repeatedly transported by a conveying means. The surface of the protective layer is often scratched by scraping on the surface when those foreign matters are hard. A protective layer having a high scratch resistance property is required since it is known that occurrence of a scratched protective layer adversely affects a picture image quality.

Thus, applicable materials used for a protective layer are selected in such a way to give to the protective layer functions necessary as a protective layer such as scratch resistance and transport durability, while controlling a decline of sharpness by making the protective layer to be as thin as possible. For example, those having strength like that of polyethylene terephthalate and high light transmittance are used, several kinds of resins are combined, a layer of a resin compound containing a fluorine type resin which possesses a high scratch resistance is coated, or a protective layer itself is made to be of a multilayer structure. (Refer to JP-A No. 10-82899)

There is also present a radiation image conversion panel having enhanced sharpness, high transport durability, and at the same time a high sensitivity by employing an absorbing layer of a stimulating light in a protective layer and specifying further a surface roughness. (Refer to JP-A No. 2002-122698)

SUMMARY

In the case of using a polyethylene naphthalate film and so forth as a protective layer, there was a problem with another shading except for a shading obtained from a radiographic image of an object, that is to say, a picture image unevenness which appeared. There is also a problem with a picture image unevenness caused by a coated layer prepared with a resin compound containing a fluorine type resin.

It is required that sharpness and a picture image unevenness should also be improved since a radiation image conversion panel with a specified surface roughness has an insufficient improvement of sharpness.

An object of the present invention is to provide a radiation image conversion panel wherein not only a high scratch resistance is performed, but a radiographic image with no picture image unevenness and enhanced sharpness can also be obtained at the same time.

Figure 1:
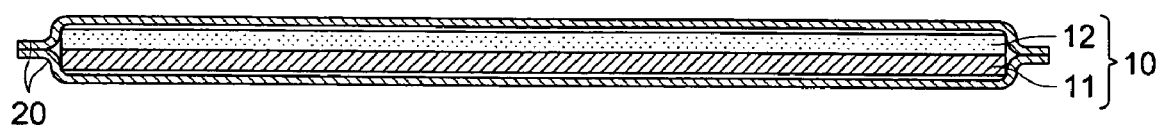
FIG. 1 is a cross-sectional view showing one example of the radiation image conversion panel of the present invention.

DESCRIPTION OF THE PREFERRED EMBODIMENTS (Structure 1) A radiation image conversion panel having a phosphor sheet prepared by coating on a support a stimulable phosphor layer and a protective layer prepared to cover the stimulable phosphor layer, wherein mean slope Δa on the outer surface of the protective layer is 0.014 or more and not more than 0.1.

(Structure 2) A radiation image conversion panel having a phosphor sheet prepared by providing on a support a stimulable phosphor layer by a vapor deposition method and a protective layer prepared to cover the stimulable phosphor layer, wherein mean slope Δa on the outer surface of the protective layer is 0.014 or more and not more than 0.1.

According to the invention described in either Structure 1 or Structure 2, a radiation image conversion panel having a high scratch resistance property can be obtained when mean slope Δa on the outer surface of the protective layer is 0.014 or more and not more than 0.1.

(Structure 3) The radiation image conversion panel according to either Structure 1 or Structure 2, wherein a scratch resistance strength is 1.3 times or more, compared with a radiation image conversion panel manufactured with the same method and the same material which are the same as those used for the radiation image conversion panel, except that mean slope Δa on the outer surface of the protective layer is 0.009.

There are a surface embossing press method and a matting addition material method as a means for adjusting the mean slope Δa on the surface of a protective layer. "The same material" means that 99 wt % or more of a constituent material used for a radiation image conversion panel is the same material in the surface embossing press method, and that an addition material, based on a protective layer is not more than 10 wt % and 99 wt % or more of a constituent material except for the addition material is the same material in the addition material method.

According to the invention described in Structure 3, a radiation image conversion panel having a higher scratch resistance property can be obtained by making a scratch strength be 1.3 times or more, compared with a radiation image conversion panel manufactured with the same method and the same material as those of the foregoing radiation image conversion panel, except that the mean slope Δa on the outer surface of the foregoing protective layer is 0.009.

(Structure 4) The radiation image conversion panel according to any one of Structures 1–3, wherein a stimulating light absorbing layer that absorbs a stimulating light is provided in the protective layer.

According to the invention described in Structure 4, the sharpness of the radiation image conversion panel can be enhanced since a stimulating light which is scattered and reflected at the interface of a protective layer can be absorbed by providing a stimulating light absorbing layer in the protective layer.

(Structure 5) The radiation image conversion panel according to Structures 1–4, wherein the foregoing phosphor plate is formed after being cut to the given size, moisture resistance protective films are placed above and below the phosphor sheet, and the moisture resistance protective films arranged on the top and the bottom of the phosphor sheet adhered to each other at the outer portion of the edges of the phosphor sheet in such a way that the whole surface of the phosphor sheet is covered by the protective layer.

According to the invention described in Structure 5, moisture resistance protective films placed above to cover the total surface of the phosphor sheet cut to the prescribed size adhered to each other on the outer portion of edges of the phosphor sheet, thus, the phosphor sheet can be surely sealed.

DETAILED DESCRIPTION OF THE INVENTION

The present invention will be explained further in detail as described below. As shown in FIG. 1, a radiation image conversion panel in the present invention is composed of phosphor sheet 10 having stimulable phosphor layer 12 formed on support 11 and moisture resistance protective film 20 by which at least stimulable phosphor layer 12 in phosphor sheet 10 is covered and sealed.

Various polymeric materials are used for support 11. A sheet having a flexibility property or what can be processed to a web is especially suitable for handling an information recording material. From this point of view, plastic films such as a cellulose acetate film, a polyester film, a polyethylene terephthalate film, a polyethylene naphthalate film, a polyamide film, a polyimide film, a triacetate film, a polycarbonate film, and so forth are preferable.

Though thicknesses of those supports 11 vary, depending on material and so forth, the thickness is, in general, 80 to 100 μm and is preferably 80 to 500 μm from the aspect of handling.

The surfaces of those supports 11 may be either smooth-surfaces or mat surfaces for the purpose of upgrading adhesion with a stimulable phosphor layer. An underlayer may be provided on the surface of support 11 on which a stimulable phosphor layer is formed further for the purpose of upgrading adhesion with a stimulable phosphor layer.

A thickness of stimulable phosphor layer 12 is 50 μm or more and is preferably 300 to 500 μm. Though usually, a known material can be used as a stimulable phosphor used for stimulable phosphor layer 12, the stimulable phosphor, specifically expressed by formula (1), can be used;

$$M^1X \cdot aM^2X'_2 \cdot bM^3X''_3 : eA \qquad (1)$$

where $M^1$ represents at least one alkali metal selected from the group consisting of Li, Na, K, Rb and Cs, and it is preferably at least one alkali metal selected from the group consisting of K, Rb and Cs, in particular.

$M^2$ represents at least one divalent metal selected from the group consisting of Be, Mg, Ca, Sr, Ba, Zn, Cd, Cu and Ni, and it is preferably at least one divalent metal selected from the group consisting of Be, Mg, Ca, Sr, and Ba, in particular.

$M^3$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In, and it is preferably at least one trivalent metal selected from the group consisting of Y, La, Ce, Sm, Eu, Gd, Lu, Al, Ga and In in particular.

Each of X, X' and X" represents at least one halogen selected from the group consisting of F, Cl, Br and I, and X especially represents at least one halogen selected from the group consisting of Br and I preferably.

A represents at least one metal selected from the group consisting of Eu, Tb, In, Ga, Cs, Ce, Tm, Dy, Pr, Ho, Nd, Yb, Er, Gd, Lu, Sm, Y, Tl, Na, Ag, Cu and Mg, and it is preferably at least one metal selected from the group consisting of Eu, Cs, Sm, Tl, and Na, in particular.

The symbols a, b and e show respectively numerical values in the ranges of $0 \leq a < 0.5$, $0 \leq b < 0.5$ and $0 < e \leq 0.2$, and it is especially preferable that b shows a numerical value in the range of $0 \leq b \leq 0.01$.

It is preferable that a phosphor among those, expressed by the following formula (2), is used;

$$CsX:A \qquad (2)$$

where X represents Br or I, and A represents Eu, In, Ga or Ce.

A stimulable phosphor mentioned above is manufactured with phosphor materials exemplified below in (a), (b), (c) and (d) by the method described below.

(a) At least one compound or two compounds or more selected from the group consisting of LiF, LiCl, LiBr, LiI, NaF, NaCl, NaBr, NaI, KF, KCl, KBr, KI, RbF, RbCl, RbBr, RbI, CsF, CsCl, CsBr and CsI.

(b) At least one compound or two compounds or more selected from the group consisting of $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$.

(c) At least one compound or two compounds or more selected from the group consisting of ScF3, ScCl3, ScBr3, ScI3, YF3, YCl3, YBr3, YI3, LaF3, LaCl3, LaBr3, LaI3, CeF3, CeCl3, CeBr3, CeI3, PrF3, PrCl3, Prbr3, PrI3, NdF3, NdCl3, NdBr3, NdI3, PmF3, PmCl3, PmBr3, PmI3, SmF3, SmCl3, SmBr3, SmI3, EuF3, EuCl3, EuBr3, EuI3, GdF3, GdCl3, GdBr3, GdI3, TbF3, TbCl3, TbBr3, TbI3, DyF3, DyCl3, DyBr3, DyI3, HoF3, HoCl3, HoBr3, HoI3, ErF3, ErCl3, ErBr3, ErI3, TmF3, TmCl3, TmBr3, TmI3, YbF3, YbCl3, YbBr3, YbI3, LuF3, LuCl3, LuBr3, LuI3, AlF3, AlCl3, AlBr3, AlI3, GaF3, GaCl3, GaBr3, GaI3, InF3, InCl3, InBr3 and InI3.

(d) At least one metal or two metals or more selected from the group consisting of Eu, Tb, In, Ga, Cs, Ce, Tm, Dy, Pr, Ho, Nd, Yb, Er, Gd, Lu, Sm, Y, Tl, Na, Ag, Cu and Mg.

Phosphor materials, which have been selected from the foregoing (a) to (d) so as to meet the numerical range of a, b, and c represented by formula (1), are weighed and mixed in pure water. In this regard, there may be conducted sufficient mixing using a mortar, ball mill or mixer mill.

Next, a prescribed amount of an acid is added to adjust a pH value of C in the thus solution obtained so as to fall within the range of $0 < C < 7$, and then any water is vaporized.

Further, the raw material mixture obtained is charged into a heat-resistant vessel such as a silica port, an alumina crucible or a silica crucible and then placed in an electric furnace to be calcined. The calcination temperature is preferably 500 to 1000° C. The calcination time, depending on a charging amount of raw material, calcination temperature and the like, is preferably 0.5 to 6 hrs.

As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an inert gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the stimulable phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere, neutral atmosphere or a weakly oxidizing atmosphere.

Emission luminance of the obtained stimulable phosphor can be further enhanced by moving calcined material from a heating area to an cooling area in an electric furnace and then quenching it in a weakly reducing atmosphere, neutral atmosphere or a weakly oxidizing atmosphere.

Stimulable phosphor layer 12 is formed on one surface of support 11 with a vapor deposition method or a coating method by using a stimulable phosphor described above. A vacuum evaporation method, a sputter deposition method, and a CVD method can be employed as a vapor deposition method.

Vacuum evaporation is conducted in such a manner that after placing support 11 prepared by cutting support material at a given size in an evaporation apparatus, the inside of the apparatus is evacuated to a vacuum degree of about $1.333 \times 10^{-4}$ Pa. Subsequently, a stimulable phosphor which has been formed by a press or a hot press is filled up in a crucible and it is placed in the inside of the evaporation apparatus.

And then, the stimulable phosphor is evaporated with heating by a resistance heating method or an electron-beam method to cause the phosphor to be deposited on the surface of support 11 to a desired thickness.

As a result, stimulable phosphor layer 12 containing no binder is formed, provided that the evaporation process described above may be divided into plural times to form stimulable phosphor layer 12.

Alternatively, in this evaporation process, plural stimulable phosphor raw materials as an evaporation source are co-evaporated, employing plural resistance heaters or electron beams and the intended stimulable phosphor is synthesized on support 11, simultaneously forming stimulable phosphor layer 12.

Sputter deposition, as is the case with vacuum deposition, is conducted in such a manner that after setting support 11 in a sputtering apparatus, the inside of the apparatus is evacuated to a vacuum level of about $1.333 \times 10^{-4}$ Pa and then inert gas used for sputtering such as Ar and Ne is introduced therein at a gas pressure of ca. $1.333 \times 10^{-1}$ Pa. Subsequently, sputtering is carried out with targeting the stimulable phosphor to cause the phosphor to be deposited on support 11 so as to have a desired thickness of stimulable phosphor layer 12.

In this sputtering process, as is the case with an evaporation process, stimulable phosphor layers can be formed, collecting each of plural times of sputtering and stimulable phosphor layers can also be formed by sputtering the foregoing targets simultaneously or sequentially. In the case of a sputtering process, the intended stimulable phosphor layer can also be formed on a support, using plural stimulable phosphor materials as a sputtering target and a reaction sputtering process may be introduced by providing gases such as $O_2$ or $H_2$ as needed. In addition, in a sputtering process, a support may be cooled or heated as needed at the time of sputtering. A heat treatment applied for a stimulable phosphor may also take place after the sputtering process is completed.

A stimulable phosphor layer having no binder on a support can be obtained with a CDV method by decomposing an organometallic compound containing the intended stimilable phosphor or the phosphor raw material with heat or a high frequency electric power and elongated columnar crystals which are independently grown in a vapor phase at a slant to the normal direction of a support can be formed as a stimulable phosphor layer.

Incidentally, a vapor-phase growth rate of stimulable phosphor layer 12 in a vapor deposition process is preferably 0.05 to 300 μm/min. The growth rate less than 0.05 μm/min is not preferable since the productivity of a radiation image conversion panel worsens. The growth rate more than 300 μm/min is not also preferable since it is difficult to control the growth rate.

In the formation of stimulable phosphor layer 12 by the vapor deposition process, support 11 on which stimulable phosphor layer 12 is to be formed, is preferably heated at a temperature between 50 and 400° C., preferably between 100 and 250° C. from the aspect of phosphor properties, more preferably between 50 and 150° C. in consideration of heat resistance properties of resins, and still more preferably between 50 and 100° C.

Figure 2:
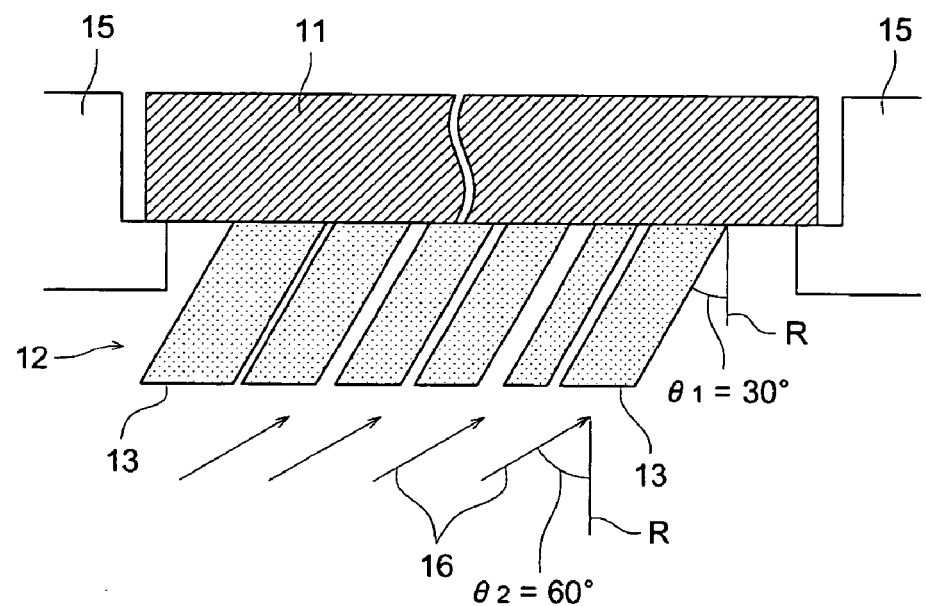
FIG. 2 is a cross-sectional view showing how to form a stimulable phosphor layer prepared for the radiation image conversion panel of the present invention.
Figure 3:
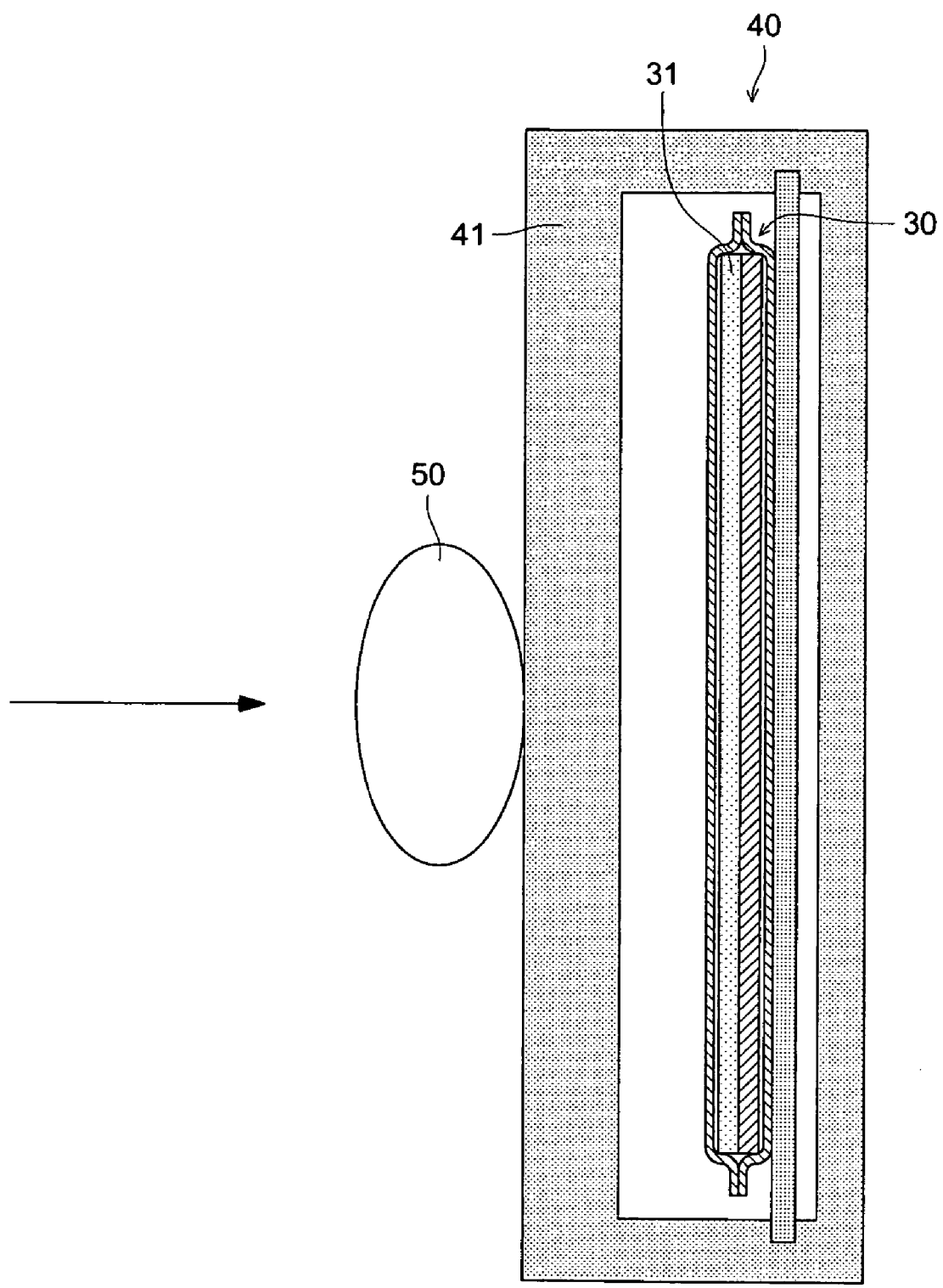
FIG. 3 is a schematic diagram showing an imaging method using the radiation image conversion panel.

FIG. 2 illustrates the mode of forming stimulable phosphor layer 12 on support 11 by the vacuum evaporation method, in which vapor streams 16 of a stimulable phosphor are introduced at an incident angle $\theta_2$ (in the Figure, $\theta_2$=60°) to the line (R) normal to the surface of support 11 attached to support holder 15 to form columnar crystals 13 on the support, at an angle of $\theta_1$ (in the Figure, $\theta_1$=30°, empirically, about a half of the incident angle $\theta_2$).

The angle of growth on columnar crystals 13 of a stimulable phosphor should be 10 to 70° and is preferably 20 to 55°. The incident angle should be 20 to 80° to make the angle of growth on columnar crystals be 10 to 70° and should also be 40 to 70° to make it be 20 to 55°. When the angle of growth on columnar crystals is large, columnar crystals 13 are tilted largely in the direction of support 11, so that stimulable phosphor layer 12 becomes brittle.

There is a method of placing support 11 tilted to an evaporation source in order to supply vapor streams of the stimulable phosphor or the phosphor raw material in the direction of a certain incident angle to support 11. There is also another, possible method of placing parallel support 11 and an evaporation source with each other and controlling vapor streams in such a way that only an oblique component from the evaporation plane is evaporated onto support 11 through a slit.

In those cases, a minimal distance between support 11 and an evaporation source, matched with a mean range of a stimulable phosphor, is preferably designed to be approximately 10 to 60 cm.

In order to improve a modulation transfer function (MTF) associated with stimulable phosphor layer 12 having columnar crystals 13, a size of columnar crystal 13 is preferably 0.5 to 50 μm and is more preferably 0.5 to 20 μm. When columnar crystal 13 is thinner than 0.5 μm in size, MTF drops because of stimulated emission light scattered by columnar crystal 13 and also when columnar crystal 13 is 50 μm or thicker in size, MTF drops because of decline in the directivity of stimulated emission light.

In addition, the size of columnar crystal 13 is a mean value of diameters obtained by converting circles of cross-sectional areas of each columnar crystal 13 through an observation of the surface of columnar crystal 13 parallel to the plane of support 11 and it is calculated, using a micrograph possessing at least 100 columnar crystals 13 or more in the field of vision.

A spacing length between columnar crystals 13 is preferably not more than 30 μm and is still more preferably not more than 5 μm. When the spacing length is more than 30 μm, sensitivity drops since a decline of a filling factor of phosphor in a phosphor layer occurs.

Since the width of columnar crystal 13 is influenced by a temperature of support 11, a degree of vacuum, an incident angle of a vapor stream, and so forth, a desired width of columnar crystal 13 can be obtained by controlling those factors.

Since stimulable phosphor 12 containing no binder which is formed on support 11 exhibits a superior directivity, so that the directivity of stimulated emission light or stimulated emission light and stimulated luminescence becomes high, a thicker layer of stimulable phosphor 12 containing no binder can be allowed to be designed, compared with the thickness in the case of a radiation image conversion panel having a dispersion type of stimulable phosphor layer 12 dispersing a stimulable phosphor in a binder. Sharpness of images is further improved since the stimulated emission light scattering in stimulable phosphor layer 12 decreases.

Further, spacing between columnar crystals may be filled with a filler such as a binder to strengthen stimulable phosphor layer 12. Furthermore, material exhibiting high light absorbance or high reflectance may be used as a filler. The use thereof prevents lateral diffusion of stimulated emission light entering stimulable phosphor layer 12, in addition to the foregoing strengthening effect.

Material exhibiting high reflectance refers to one exhibiting a high reflectance with respect to stimulated luminescence (400 to 600 nm, specifically 400 to 500 nm), including white pigments and colorants ranging violet to blue (blue type colorants).

White pigments can-also reflect stimulating light. Examples thereof include $TiO_2$ (anatase type, rutile type), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$), magnesium silicate, basic silisulfate, basic lead phosphate, aluminum silicate, Al, Mg, Ag and In. These white pigments exhibit high covering power and have a refractive index high, whereby stimulated luminescence is easily scattered through reflection or refraction, leading to enhanced luminance of the radiation image conversion panel.

Either organic colorants or inorganic colorants can also be used for blue type colorants. Examples of organic colorants include Zapon Fastblue 3G (produced by Hoechst A. G.), Estrol Brillblue N-3RL (produced by Sumitomo Chemical Ind. Co.Ltd.), D6CBlue No. 1 (produced by National Aniline Co.), Spirit Blue (produced by HODOGAYA KAGAKU Co., Ltd.), Oilblue No. 603 (produced by Orient. Co., Ltd.), Kiton Blue A (produced by Chiba Geigy Co.), Aisen Cationblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—Co—NiO type pigments.

Examples of material exhibiting high light absorbance include carbon, chromium oxide, nickel oxide and iron oxide.

Initially, a stimulable phosphor and a binder are added to a suitable solvent. The resulting mixture is well blended, a coating composition having particles of the stimulable phosphor and the binder which are uniformly dispersed is prepared, and the coating composition is coated on the support material used for support 11.

Listed as examples of solvents, employed to prepare the coating composition, are lower alcohols such as methanol, ethanol, isopropanol, and n-butanol; ketones such as acetone, methyl ethyl ketone, methyl isobutyl ketone, and cyclohexanone; esters of lower fatty acids and lower alcohols such as methyl acetate, ethyl acetate, and n-butyl acetate; ethers such as dioxane, ethylene glycol monoethyl ether and ethylene glycol monomethyl ether; aromatic compounds such as triol and xylol; halogenated hydrocarbons such as methylene chloride and ethylene chloride; and mixtures thereof.

Examples of binders include proteins such as gelatin, polysaccharides such as dextran, natural polymers such as gum Arabic, and synthetic polymers such as polyvinyl butyral, polyvinyl acetate, nitrocellulose, ethylcellulose, vinylidene chloride-vinyl chloride copolymers, polyalkyl acrylate, polyalkyl, (meta)acrylate, vinyl chloride-vinyl acetate copolymers, polyurethane, cellulose acetate butyrate, polyvinyl alcohol, and linear polyesters.

Of these, most preferred are nitrocellulose, linear polyester, polyalkyl(meta)acrylate, mixtures of nitrocellulose and linear polyesters, mixtures of nitrocellulose and polyalkyl(meta)acrylate, and mixtures of polyurethane and polyvinyl butyral. Further, these binders may be subjected to cross-linking employing bridging agents.

Further, binders are used in an amount ranging from 0.01 to 1 part by weight per part by weight of stimulable phosphor. However, from the viewpoint of sensitivity and sharpness of a radiation image conversion panel, only minimal binders are preferably employed. To facilitate ease of coating, the preferred range is from 0.03 to 0.2 parts by weight per part by weight of stimulable phosphor.

Further, various additives such as dispersing agents to enhance the dispersion of stimulable phosphors in the coating composition, and plasticizers to enhance the bonding force between a stimulable phosphor and a binder in stimulable phosphor layer 12 after coating may be incorporated into the coating composition.

Listed as examples of dispersing agents may be phthalic acid, stearic acid, caproic acid, and oleiophilic surface active agents. Listed as examples of plasticizers are phosphate esters such as triphenyl phosphate, tricresyl phosphate, and diphenyl phosphate; phthalic acid esters such as dimethoxyethyl phthalate; glycolic acid esters such as ethyl phthalyl ethyl glycolate and butyl phthalyl butyl glycolate; polyesters of polyethylene glycol with aliphatic dibasic acids such as polyester of triethylene glycol with adipic acid and polyester of diethylene glycol with succinic acid.

A coating composition may be prepared, employing any of the common homogenizers such as a ball mill, a sand mill, an attritor, a three-pole mill, a high-speed impeller homogenizer, a Kady mill, and an ultrasonic homogenizer.

The coating composition prepared is coated on material used for a support, employing a doctor blade, a roll coater, and a knife coater. Next, the resulting coated layer is dried through gradual heating, whereby the formation of stimulable phosphor layer 12 is completed.

Thickness of stimulable phosphor layer 12 formed by a vapor deposition method or a coating method varies, depending on intended characteristics of a radiation image conversion panel, the type of stimulable phosphors, a mixture ratio between a phosphor and a binder, and so forth, but it is preferably selected in the range between 10 and 1000 µm and more preferably in the range between 10 and 500 µm.

After stimulable phosphor layer 12 is coated on the support material, both stimulable phosphor layer 12 and the support material are cut together into a predetermined size and phosphor sheet 10 is prepared. For cutting, any of the common method may be employed. From the viewpoint of working property and accuracy, a cosmetics cutter or a punch machine is preferably employed. When the support material is small enough, it may be used as it is for support 11, without being cut.

After forming phosphor sheet 10 in the foregoing manner, stimulable phosphor 12 is coated with a moisture resistance protective layer 20 and phosphor sheet 10 is sealed.

Specifically employed as materials for preparing moisture resistance protective film 20 may be polyester film, polymethacrylate film, nitrocellulose film, and cellulose acetate film. Of these, films such as polyethylene terephthalate film and polyethylene naphthalate film are preferred for moisture resistance protective film 20 in terms of transparency as well as strength. Olefin (fluoroolefin) polymer containing fluorine or co-polymer containing a co-polymer component with olefin containing fluorine for a resin composition layer containing fluorine type resin are preferable in terms of scratch resistance.

Though moisture resistance protective film 20 may be formed on a phosphor layer having the thickness matched with transport durability required for transparent organic polymer material such as the foregoing cellulosic and polymethylmethacrylate, or organic polymer film such as polypropylene and polyethylene terephthalate, the organic polymer film is more preferable in terms of strength and the resin composition layer containing fluorine type resin can be coated on the film as needed.

It is possible to provide an absorbing layer which absorbs a stimulating light in moisture resistance protective film 20. The stimulating light absorbing layer is a layer containing colorants selectively absorbing the stimulating light and the stimulating light absorbing layer may be applied onto one or both surfaces of moisture resistance protective film 20, or moisture resistance protective film 20 itself may be a stimulating light absorbing layer which is tinted with such colorants.

Optimally, a stimulating light absorbing layer should be provided in such a way that the light transmittance of moisture resistance protective film 20 at the wavelength of stimulating light is 50 to 98% of the light transmittance of the moisture resistance protective film 20 which is the same as the foregoing light transmittance of moisture resistance protective film 20 except that the stimulating light absorbing layer is not provided. Effect of the present invention is small when the light transmittance exceeds 98% and luminance of a radiation image conversion panel drops drastically when the light transmittance is less than 50%.

The type of colorants to be employed is determined depending on the wavelength of stimulating light and stimulated luminescence of the stimulable phosphor employed. Employed as stimulable phosphors for a radiation image conversion panel are phosphors which result in stimulated luminescence in the wavelength range of 300 to 500 nm, utilizing stimulating light in the wavelength range of 400 to 900 nm. Accordingly, employed as colorants are the blue to green organic or inorganic colorants described below.

Listed as examples of the blue to green organic colorants are Zapon First Blue 3G (manufactured by Hoechst AG), Estrol Brill Blue N-3RL (manufactured by Sumitomo Kagaku Co., Ltd.), Sumiacryl Blue F-GSL (Sumitomo Kagaku Co., Ltd.), D & C Blue No. 1 (manufactured by National Aniline AG), Spirit Blue (manufactured by Hodogaya Kagaku Co., Ltd.), Oil Blue No. 603 (manufactured by Orient Co., Ltd.), Kiton Blue A (manufactured by Ciba-Geigy Co.), Aizen Cathilon Blue GLH (manufactured by. Hodogaya Kagaku Co., Ltd.), Lake Blue A, F, H (Kyowa Sangyo Co., Ltd.), Rodarin Blue 6GX (Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (Toyo Ink Co., Ltd.), and Lionol Blue SL (manufactured by Toyo Ink Co., Ltd.). Further, listed as examples of the blue to green inorganic colorants are ultramarine blue, cobalt blue, cerulean blue, chrome oxide, and $TiO_2$—ZnO—CoO—NiO based pigments. However, the present invention is not limited to these examples.

When material possessing a high refractive index is used for moisture resistance protective film 20, some of the stimulating light entering the interior of the protective film is repeatedly reflected at the upper and lower surfaces of the film. As a result, stimulated luminescence is transmitted to the position that is away from the scanned position due to propagation of the stimulating light, whereby sharpness is degraded. The stimulating light is a coherent light of relatively long wavelengths, from red to infrared. Therefore, as long as scattered light as well as reflection light is not sufficiently absorbed, the amount of light absorbed by the interior of moisture resistance protective film 20 and the space of the interior of the reading device is less. Thus, the stimulating light is propagated to relatively distant positions, resulting in the degradation of sharpness. It is assumed that the stimulating light absorbing layer is effective in suppressing the scattered light and the reflected light.

This effect shows a remarkable result when mean slope Δa on the outer surface of moisture resistance protective film 20 is 0.01 or more. The foregoing mean slope Δa means the arithmetical mean slope Δa referring to JIS B 0660 (1998).

In addition, the international standard corresponding to the foregoing JIS B 0660 (1998) is ISO 4287-1 (Surface roughness-Terminology-Part 1: Surface and its parameters). Note that mean slope Δa is expressed in the foregoing standard as shown below.

$$\Delta_a = \frac{1}{l}\int_0^l \left|\frac{dy}{dx}\right|dx$$

Though the total reflection of a stimulating light is prevented presumably at the interface of a protective layer with mean slope Δa close to this value, not much of the foregoing effect can be seen when no stimulating light absorbing layer is provided in moisture resistance protective film 20. Therefore, it is speculated that the foregoing effect means a synergistic effect between a preventing effect of scattering in the stimulating light absorbing layer and a preventing effect of total reflection at mean slope Δa on the outer surface of moisture resistance protective film 20. It is not preferable that mean slope Δa on the outer surface of moisture resistance protective film 20 is 0.1 or more, because the light transmittance of a stimulating light drops.

There are a surface embossing press method and a matting addition material method available for making the mean slope Δa on the surface of moisture resistance protective layer 20 larger. There are also a method by which a coating composition of a resin composition layer containing fluorine type resin in which inorganic material such as silica and so forth is dispersed is coated on the surface of moisture resistance protective layer 20 and a method of selecting a resinous film type of the outermost surface in the plural film lamination technique. However, the present invention is not limited to these methods.

It is easy to select a film having the required mean slope Δa since resinous films having various surface shapes are generally available on the market. A surface roughness can be adjusted by selecting roughness of a resinous film used and by coating a coated film containing inorganic material on the surface of a resinous film. It is also possible to tint this coated film with colorants to make it to be a stimulating light absorbing layer. Further, a resinous film having any surface roughness can be easily obtained these days.

In the case of using a resinous film as moisture resistance protective film 20, it may be considered to be of the structure of a plurality of laminated layers of resinous films or metalized films which have been subjected to vacuum evaporation employing metal oxides, which is matched with required properties of scratch resistance and moisture resistance.

In this case, the stimulating light absorbing layer is protected from physical impact as well as chemical modification when it is provided between laminated resinous films, and constant plate performance can be maintained over a long period of time, which is preferable. The stimulating light absorbing layer may be provided between the laminated resinous films at a plurality of locations. Further, an adhesion layer, employed for lamination may contain colorants, and may be employed as a stimulating light absorbing layer.

It is preferable that the foregoing moisture resistance protective film be provided on both sides of the phosphor sheet which is cut in a given size, and the peripheral edges of both moisture resistance protective films 20 are welded or adhered with an adhesive agent at the exterior of the periphery of phosphor sheet 10. The sealed structure can be formed by this as shown in FIG. 1 and it is possible to reliably prevent moisture entrance at the periphery of phosphor sheet 10.

It becomes possible that the peripheral edges of both moisture resistance protective films 20 are welded at the exterior of the periphery of phosphor sheet 10 by preparing a thermo-welding resinous layer on the surface of the side in contact with phosphor sheet 10 of moisture resistance protective film 20 in order to realize the sealed structure, and the efficiency of sealing processes can be improved.

The thermo-welding film, as described herein, refers to a resinous film capable of being welded, employing a commonly used impulse sealer, and includes, for example, ethylene-vinyl acetate copolymer film (EVA), polypropylene (PP) film, and polyethylene film (PE). However, the present invention is not limited to these examples.

In the case of using a thermo-welding film as moisture resistance protective film 20, the optimal moisture resistance can be obtained by laminating a plurality of thermo-welding films to match required moisture resistance properties. Though any method which is commonly known may be accepted as a laminate technique in this case, a dry laminate technique is superior to others from the aspect of workability.

EXAMPLE

The present invention is hereinafter explained in examples. However, the present invention is not limited to these examples.

(Preparation of Coating Type Phosphor Sheet)

Stimulable phosphor (0.85 BaFBr·0.15I: 0.001Eu$^{2+}$) 200 g, polyurethane resin (PANDEX T5265 manufactured by Dainippon Ink and Chemicals, Inc.) 8.0 g, and yellow resistance agent: epoxy resin (EP1001 manufactured by Yuka-Shell Epoxy Co.,Ltd.) 2.0 g were added to methyl ethyl ketone, dispersed by a propeller mixer, and the coating composition for forming a phosphor layer having 30 Pa·s (25° C.) in viscosity was prepared. This coating composition was coated on a polyethylene terephthalate film (PET film, thickness: 300 μm) and was dried, and the stimulable phosphor sample (phosphor sheet) provided thereon with a coated stimulable phosphor layer (thickness: 230 μm) was obtained.

(Preparation of Vapor Deposition Type Phosphor Sheet)

A support (crystallized glass of 1 mm thick and 410 mm×410 mm in area, manufactured by Nippon Denki Glass Co., Ltd) was set in a vapor deposition apparatus and then, phosphor raw material (CsBr: 0.0001Eu) to be an evaporation source, which was molded in a press, was put into a water-cooled crucible. A distance between the support and the evaporation source was set to be 60 cm. An aluminum slit was placed between the support and the evaporation source.

Then, the inside of the vapor deposition apparatus was evacuated by connecting a pump to an exhaust port, and nitrogen gas was introduced from a gas supply port [1000 sccm in gas flow (sccm: standard cc/min ($1 \times 10^{-6}$ m$^3$/min))] and a degree of vacuum inside the apparatus was maintained to be $6.65 \times 10^{-3}$ Pa. The evaporation source was heated at 650° C. in this situation and the stimulable phosphor obtained from phosphor CsBr: 0.0001 Eu was vapor-deposited on one side of the surface of a support.

Vapor streams of a stimulable phosphor passed through an aluminum slit, were introduced at an incident angle 0° to the line normal to the surface of a support and evaporated while transporting a support in the direction parallel to the support. The evaporation was stopped at the point where the thickness of a stimulable phosphor layer became 400 μm and the stimulable phosphor sample (phosphor sheet) was prepared.

(Preparation of Protective Film 1)

A polyethylene terephthalate (PET) film having various mean slopes Δa shown in Table 1 and having 12 μm in thickness was used as a protective film for a phosphor sheet. An adhesive agent (VYLON 300, manufactured by Toyobo Co., Ltd.) coated on the PET film surface of the side in contact with the phosphor sheet was dried and the adhesive layer was placed to be 1 μm thick.

(Preparation of Stimulating Light Absorbing Layer)

Fluorine type resin: fluoroolefin-vinylether copolymer (LUMIFLON LF100, 50 percent by weight xylene solution, manufactured by Asahi Glass Co., Ltd.) 50 g, bridging agent: isocyanate (CORONATE HX, solid part: 100 percent by weight, manufactured by Nippon Polyurethane Industry Co., Ltd.) 5 g, and alcohol-modified silicone oligomer [having dimethyl polysiloxane skeletone with hydroxy groups (carbinol group) at both ends, X-22-2809, manufactured by Shin-Etsu Chemical Co.,Ltd., solid part: 66 percent by weight] 0.5 g were added to methyl lethyl ketone solution and a coating composition with 0.1–0.3 Pa·s in viscosity was prepared. Next, a mixture-dispersion liquid of a blue organic colorant (Zabon First Blue 3G, manufactured by Hoechst Co.) which had been dispersed into methyl ethyl ketone and silica (0.2–2.0 μm in particle diameter) was added to this coating composition and the resultant coating composition was coated on the surface of a PET film, using a doctor blade. This PET film was treated with heat at 120° C. for 20 min. and a stimulating light absorbing layer was formed by curing the foregoing coating composition with heat.

A stimulating light absorbing layer having a given light transmittance was prepared by adjusting an amount of colorant and silica. Light transmittance at the stimulating light absorbing layer mentioned here is the value obtained in the case where it is compared with the light transmittance in only this different case of having no stimulating light absorbing layer, at the wavelength (633 nm) of He—Ne laser for protective film 1 or 2 in Table 1.

(Preparation of Rear Surface Protective Film)

A protective film on the side of the support surface was designed to be a dry laminate film having sealant film/ aluminum foil 9 μm thick/polyethylene terephthalate (PET) 188 μm thick. The thickness of an adhesive layer in this case is 1.5 μm and a two-liquid reaction type of urethane adhesive agent was used.

(Preparation of Protective Film 2)

A structure as shown below in (A) was used for a protective film on the side of the phosphor surface of a phosphor sheet.

matted film/VMPET12/sealant film 30 . . . (A)

Here, matted film means each type of films (available on the market) for which a matting process was applied to the film surface, VMPET means an alumina evaporation PET (available on the market: manufactured by Toray Advanced Film Co., Ltd.) and sealant film also means a thermowelding film having CPP (casting polypropylene). In addition, the numerals indicated behind each resinous film mean thickness (μm) and the foregoing symbol "/" means a dry laminate adhesive layer having an adhesive thickness of 2.5 μm. A two-liquid reaction type of urethane adhesive agent was used for the dry laminate adheasion.

(Preparation of Stimulating Light Absorbing Layer)

A blue organic colorant (Zabon First Blue 3G, manufactured by Hoechst Co.) which had been dispersed and dissolved into methyl ethyl ketone was added to the adhesive agent solution which was used at this time and this adhesive layer was designed to be a stimulating light absorbing layer. At the same time, mean slope Δa on the surface was also adjusted by varying types of matted films and laminate protective films having various mean slopes Δa were prepared.

Various radiation image conversion panels described below were manufactured, using the forgoing coating type or vapor deposition type of phosphor sheet, protective film 1 or 2 and a rear surface protective film.

In addition, numeric values of the foregoing mean slope Δa determined with-data obtained through measurements by an integrated surface texture and contour measuring instrument SURFCOM 1500A, manufactured by Tokyo Seimitsu Co.,Ltd., were applied to the samples used for various film surfaces which appeared in the present invention.

Example 1

The coating type phosphor sheet was cut to a square of 45 cm square. A PET film having mean slope on the surface Δa=0.017, which was employed for protective film 1, was used. The light transmittance was also designed to be 99.5% with no colorant contained in a stimulating light absorbing layer.

The rear surface protective film was placed on the side of a support while protective film 1 was placed on the side of a stimulable phosphor layer of the phosphor sheet. Protective film 1 was placed with its surface on the stimulating light absorbing layer side facing the side of the stimulable phosphor layer.

The phosphor sheet was sealed under reduced pressure by welding protective film 1 and the rear surface protective film at the peripheral portion with an impulse sealer. The thermowelding process took place in such a manner that a distance from the welded area to the peripheral portion of the phosphor sheet becomes 1 mm. A heater of 8 mm in width in the impulse sealer, which was employed in the thermowelding process, was used.

Example 2

The PET film of Example 1 having mean slope on the surface Δa=0.014 was used. The light transmittance was also designed to be 95.0% with a colorant contained in a stimulating light absorbing layer.

Example 3

The PET film of Example 1 having mean slope on the surface Δa=0.019 was used. The light transmittance was also designed to be 90.0% with a colorant contained in a stimulating light absorbing layer.

Example 4

The PET film of Example 1 having mean slope on the surface Δa=0.050 was used. The light transmittance was also designed to be 80.0% with a colorant contained in a stimulating light absorbing layer.

Example 5

The PET film of Example 1 having mean slope on the surface Δa=0.100 was used. The light transmittance was also designed to be 70.0% with a colorant contained in a stimulating light absorbing layer.

Example 6

The vapor deposition type of phosphor sheet in Example 1 was used and the PET film having mean slope on the surface Δa=0.017 was used. The light transmittance was also designed to be 95.0% with a colorant contained in a stimulating light absorbing layer.

Comparative Example 1

The PET film of Example 1 having mean slope on the surface Δa=0.006 was used. The light transmittance was also designed to be 99.5% with no colorant contained in a stimulating light absorbing layer.

Comparative Example 2

The PET film of Example 1 having mean slope on the surface Δa=0.011 was used. The light transmittance was also designed to be 99.5% with no colorant contained in a stimulating light absorbing layer.

Comparative Example 3

The PET film of Example 1 having mean slope on the surface Δa=0.006 was used. The light transmittance was also designed to be 98.0% with a colorant contained in a stimulating light absorbing layer.

Comparative Example 4

The PET film of Example 1 having mean slope on the surface Δa=0.010 was used. The light transmittance was also designed to be 98.0% with a colorant contained in a stimulating light absorbing layer.

Comparative Example 5

The vapor deposition type of phosphor sheet in Example 1 was used and the PET film having mean slope on the surface Δa=0.006 was used. The light transmittance was also designed to be 95.0% with a colorant contained in a stimulating light absorbing layer.

Example 7

Protective film 2 was used in place of protective film 1 in Example 1. The matted film having mean slope on the surface Δa=0.014, which is employed for protective film 2, was used. The light transmittance was also designed to be 99.5% with no colorant contained in a stimulating light absorbing layer. Protective film 2 was placed with its surface on the side of sealant film facing the side of the stimulable phosphor layer.

Example 8

The light transmittance was also designed to be 95.0% with a colorant contained in the stimulating light absorbing layer in Example 7.

Example 9

The matted film of Example 7 having mean slope on the surface Δa=0.019 was used. The light transmittance was also designed to be 90.0% with a colorant contained in a stimulating light absorbing layer.

Example 10

The matted film of Example 7 having mean slope on the surface Δa=0.050 was used. The light transmittance was also designed to be 80.0% with a colorant contained in a stimulating light absorbing layer.

Example 11

The matted film of Example 7 having mean slope on the surface Δa=0.100 was used. The light transmittance was also designed to be 70.0% with a colorant contained in a stimulating light absorbing layer.

Example 12

The vapor deposition type of phosphor sheet in Example 7 was used. The matted film having mean slope on the surface Δa=0.017 was used. The light transmittance was also designed to be 95.0% with a colorant contained in a stimulating light absorbing layer.

Comparative Example 6

The matted film of Example 7 having mean slope on the surface Δa=0.006 was used. The light transmittance was also designed to be 99.5% with no colorant contained in a stimulating light absorbing layer.

Comparative Example 7

The matted film of Example 7 having mean slope on the surface Δa=0.006 was used. The light transmittance was also designed to be 98.0% with a colorant contained in a stimulating light absorbing layer.

Comparative Example 8

The matted film of Example 7 having mean slope on the surface Δa=0.010 was used. The light transmittance was also designed to be 98.0% with a colorant contained in a stimulating light absorbing layer.

Comparative Example 9

The vapor deposition type of phosphor sheet in Example 7 was used. The matted film having mean slope on the surface Δa=0.006 was used. The light transmittance was also designed to be 95.0% with a colorant contained in a stimulating light absorbing layer.

[Evaluation of Radiation Image Conversion Panel]

The following evaluation was conducted, using the manufactured radiation image conversion panel prepared in the foregoing manner.

(1) Evaluation of Sharpness

Each of the radiation image conversion panels was exposed to X-rays at a tube voltage of 80 kVp through a modulation transfer function (MTF) chart made of lead. Thereafter, the exposed panel was stimulated utilizing a He—Ne laser beam (having a wavelength of 633 nm). Stimulated luminescence radiated from the phosphor layer was received by employing a light receiving device (a photomultiplier with spectral sensitivity S-5) and converted into electric signals, which were subjected to analog/digital conversion. Converted signals were recorded on a hard disk, and the MTF of recorded X-ray image recorded on the hard disk was examined by analyzing the record with a computer. MTF values (in percent) which were determined at a space frequency of 1 cycle/mm are shown below in Table 1. The MTF value is preferably as high as possible, wherein the higher the MTF value is, the better the sharpness is.

(2) Evaluation of Image Unevenness and Line Noise

Each of the radiation image conversion panels was exposed to X-rays at a tube voltage of 80 kVp, and subsequently was stimulated, upon being scanned utilizing a He—Ne laser beam (having a wavelength of 633 nm). Stimulated luminescence radiated from the phosphor layer was received by employing a light receiving device (a photomultiplier with spectral sensitivity S-5) and converted into electric signals. Subsequently, the electric signals were reproduced into images, utilizing an image reproduction device. Each of the reproduced images was printed while being enlarged at a factor of 2, employing an output device. Each of the resulting print images was visually inspected and image unevenness as well as line noise was evaluated. The image unevenness as well as the linear noise was subjected to the following evaluation, and is shown in Table 1, as described below.

a: Neither image unevenness nor line noise was totally noticed.
b: Slight image unevenness and line noise were noticed in 1 to 2 areas within the plane.
c: Slight image unevenness and line noise were noticed in 3 to 4 areas within the plane.
d: Image unevenness and line noise were noticed in 5 areas or more within the plane. But, marked image unevenness and line noise were noticed in not more than 4 areas within the plane.
e: Marked image unevenness and line noise were noticed in 5 areas or more within the plane.

(3) Evaluation of Strength Against Scratch in Image

Scratch resistance strength was measured, using a continuous weighting type of scratch tester (HEIDON-18), manufactured by Shinto Scientific Co., Ltd. Scratch tests of radiation image conversion panel A (reference sample) and B (measured sample) were conducted by varying properly the loading weight applied with a sapphire stylus (1 mil), wherein A is a radiation image conversion panel having the same material as used for the protective layer of B and mean slope on the surface of the protective layer Δa=0.009 and B is a sample which is measured in this test.

Next, with respect to scratches on the surface of the protective layer, resulting from scratch test conducted when a solid image of 1.0 in optical density was output, a load for which the image influence was visually observed was read. Mean loads of A and B were determined respectively after 10 samples on each of A and B were measured and the ratio of B/A in mean load, based on reference A, was estimated to be the resistance strength against scratches in an image of B, wherein this ratio means that the mean load over 10 samples at the starting point of a scratch in B is divided by the mean load over 10 samples at the starting point of a scratch in A. Further, the evaluation conducted as indicated below is shown in Table 1.

1.3 times or more: a
1.0 time or more and less than 1.3 times: b
less than 1.0 times: c Evaluation results obtained by (1)–(3) are shown below in Table 1.

Those having mean slope on the surface of a protective film covering a stimulable phosphor layer Δa≧0.009 were 1.3 times or more in strength resistance against scratch, compared with those having mean slope on the surface Δa=0.009.

In comparison of the case of containing a colorant with the case of containing no colorant in a stimulating light absorbing layer, the case of containing a colorant results in less image unevenness and less line noise.

The present invention makes it possible to provide a radiation image conversion panel which can produce radiographic images having an excellent sharpness and having neither image unevenness nor line noise, while having a high scratch resistance property.

[Effect of the Invention]

A radiation image conversion panel having a high scratch resistance property can be obtained, whereby a radiographic image with no picture image unevenness and enhanced sharpness can be improved.

TABLE 1

| | Phosphor sheet | Protective film | Mean slope Δa | Colorant | Light transmittance (%) | Sharpness (%) | Strength resistance against scratch | Image unevenness, line noise |
|---|---|---|---|---|---|---|---|---|
| Example 1 | Coating Type | 1 | 0.017 | No use | 99.5 | 64 | a | c |
| Example 2 | Coating Type | 1 | 0.014 | Use | 95.0 | 76 | a | a |
| Example 3 | Coating Type | 1 | 0.019 | Use | 90.0 | 79 | a | a |
| Example 4 | Coating Type | 1 | 0.050 | Use | 80.0 | 80 | a | a |
| Example 5 | Coating Type | 1 | 0.100 | Use | 70.0 | 81 | a | a |
| Example 6 | Vapor deposition type | 1 | 0.017 | Use | 95.0 | 80 | a | a |
| Comparative example 1 | Coating type | 1 | 0.006 | No use | 99.5 | 61 | c | e |
| Comparative example 2 | Coating type | 1 | 0.011 | No use | 99.5 | 64 | b | d |
| Comparative example 3 | Coating type | 1 | 0.006 | Use | 98.0 | 69 | c | d |
| Comparative example 4 | Coating type | 1 | 0.010 | use | 98.0 | 75 | b | b |
| Comparative example 5 | Vapor deposition type | 1 | 0.006 | Use | 95.0 | 79 | c | c |
| Example 7 | Coating Type | 2 | 0.014 | No use | 99.5 | 66 | a | b |
| Example 8 | Coating Type | 2 | 0.014 | Use | 95.0 | 77 | a | a |
| Example 9 | Coating Type | 2 | 0.019 | Use | 90.0 | 80 | a | a |
| Comparative example 10 | Coating type | 2 | 0.050 | Use | 80.0 | 81 | a | a |
| Comparative example 11 | Coating type | 2 | 0.100 | Use | 70.0 | 82 | a | a |
| Comparative example 12 | Vapor deposition type | 2 | 0.017 | Use | 95.0 | 81 | a | a |
| Comparative example 6 | Coating type | 2 | 0.006 | No use | 99.5 | 62 | c | e |
| Comparative example 7 | Coating type | 2 | 0.006 | Use | 98.0 | 70 | c | d |
| Comparative example 8 | Coating type | 2 | 0.010 | Use | 98.0 | 77 | b | b |
| Comparative example 9 | Vapor deposition type | 2 | 0.006 | Use | 95.0 | 79 | c | c |

Sharpness of a radiation image conversion panel can be enhanced since a stimulating light which is scattered and reflected at the interface of a protective layer can be absorbed by providing a stimulating light absorbing layer in the protective layer.

A phosphor sheet can be surely sealed in such a way that the whole surface of the phosphor sheet is coated by the protective layer described in the present invention.

What is claimed is:

1. A radiation image conversion panel having a phosphor sheet on a support a stimulable phosphor layer and a protective layer covering the stimulable phosphor layer, wherein mean slope $\Delta a$ on an outer surface of the protective layer is 0.014 or more and not more than 0.1.

2. The radiation image conversion panel according to claim 1, wherein a scratch resistance strength is 1.3 times or more, compared with a radiation image conversion panel manufactured with the same method and the same material which are the same as those used for the radiation image conversion panel, except that mean slope $\Delta a$ on the outer surface of the protective layer is 0.009.

3. The radiation image conversion panel according to claim 1, wherein a stimulating light absorbing layer that absorbs a stimulating light is provided in the protective layer.

4. The radiation image conversion panel according to claim 1, wherein the foregoing phosphor plate is formed after being cut to a given size, moisture resistance protective films are placed above and below the phosphor sheet, and the moisture resistance protective films arranged on the top and the bottom of the phosphor sheet adhered to each other at the outer portion of the edges of the phosphor sheet in such a way that the whole surface of the phosphor sheet is covered by the protective layer.

5. A radiation image conversion panel having a phosphor sheet prepared by coating on a support a stimulable phosphor layer and a protective layer covering the stimulable phosphor layer, wherein mean slope $\Delta a$ on the outer surface of the protective layer is 0.014 or more and not more than 0.1.

6. A radiation image conversion panel having a phosphor sheet prepared by providing on a support a stimulable phosphor layer by a vapor deposition method and a protective layer covering the stimulable phosphor layer, wherein mean slope $\Delta a$ on the outer surface of the protective layer is 0.014 or more and not more than 0.1.

* * * * *